(12) United States Patent
Michaud

(10) Patent No.: US 6,543,111 B1
(45) Date of Patent: Apr. 8, 2003

(54) METHOD AND APPARATUS FOR RECYCLING BELTS

(76) Inventor: Gérard Michaud, 115, St.-Denis, Saint-Lambert, P.Q. (CA), J4P 2G1

( * ) Notice: Subject to any disclaimer, the term of this patent is extended or adjusted under 35 U.S.C. 154(b) by 19 days.

(21) Appl. No.: 09/621,953

(22) Filed: Jul. 21, 2000

(51) Int. Cl.$^7$ .............. B23P 23/00; B24B 7/00; B24B 1/00
(52) U.S. Cl. .............. 29/33 R; 29/33 S; 29/30; 451/183; 451/499; 451/28
(58) Field of Search .............. 409/157, 139, 409/308, 138, 298, 301; 27/30, 28, 33 S, 33 R; 451/69, 28, 183, 500, 499, 512, 490, 184, 188; 83/425.2, 425.3

(56) References Cited

U.S. PATENT DOCUMENTS

| | | | |
|---|---|---|---|
| 2,309,456 A | * 1/1943 | Hoskin et al. | 451/535 |
| 4,083,390 A | * 4/1978 | Ingham | 83/875 |
| 4,143,565 A | * 3/1979 | Larson | 83/874 |
| 4,254,589 A | 3/1981 | Hunt, IV et al. | |
| 4,534,687 A | * 8/1985 | Hetz | 409/157 |
| 4,720,940 A | * 1/1988 | Green | 29/30 |
| 4,733,998 A | * 3/1988 | Kurisu et al. | 409/138 |
| 4,997,017 A | * 3/1991 | Dobbie | 144/128 |
| 5,007,318 A | * 4/1991 | Cox et al. | 83/425.2 |
| 5,017,061 A | 5/1991 | Mombers | |
| 5,458,446 A | * 10/1995 | Englert et al. | 409/178 |
| 5,549,510 A | * 8/1996 | Fukuda et al. | 451/246 |
| 5,596,918 A | * 1/1997 | Longwell et al. | 83/425.2 |
| 5,626,447 A | * 5/1997 | Buysman et al. | 409/139 |
| 5,882,157 A | * 3/1999 | Buysman et al. | 409/139 |
| 6,095,322 A | * 8/2000 | Buysman et al. | 198/853 |

FOREIGN PATENT DOCUMENTS

DE        49998 A   * 9/1966   .............. 198/622

* cited by examiner

Primary Examiner—William Briggs
Assistant Examiner—Erica E Cadugan

(57) ABSTRACT

An apparatus for refurbishing a belt, the latter having a width, a length and a degraded surface. The apparatus includes a frame, a grinding roller for selectively and uniformly removing a determined amount of the degraded surface along the belt width, and a positioning member to keep the belt in position during refurbishment, both the roller and the positioning member are mounted on the frame adjacent to each other. The grinding roller defines a helical grinding region thereof and a substantially complementary helical non-grinding region thereof. The positioning member has a belt abutment member spacedly positioned relative to the grinding roller to abuttingly retain the belt against the roller and a belt tensioning member to tension the belt in either side of the roller in the displacement direction of the belt. The apparatus, when not used as a kit onto an existing belt conveying machine, also includes a motor secured to the frame to selectively displace the belt relative to the grinding roller along the belt length.

20 Claims, 4 Drawing Sheets

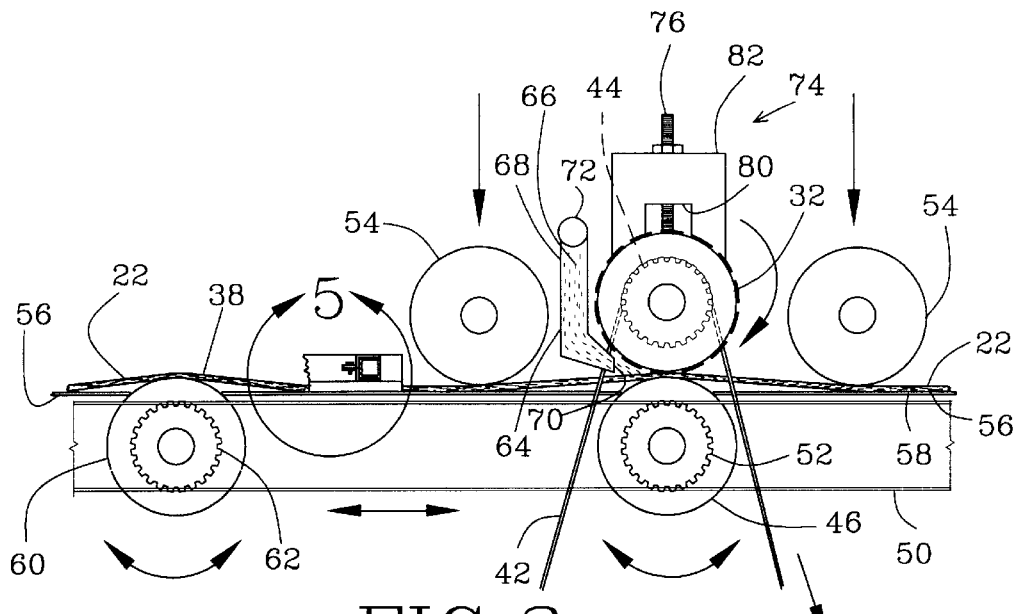
FIG. 3
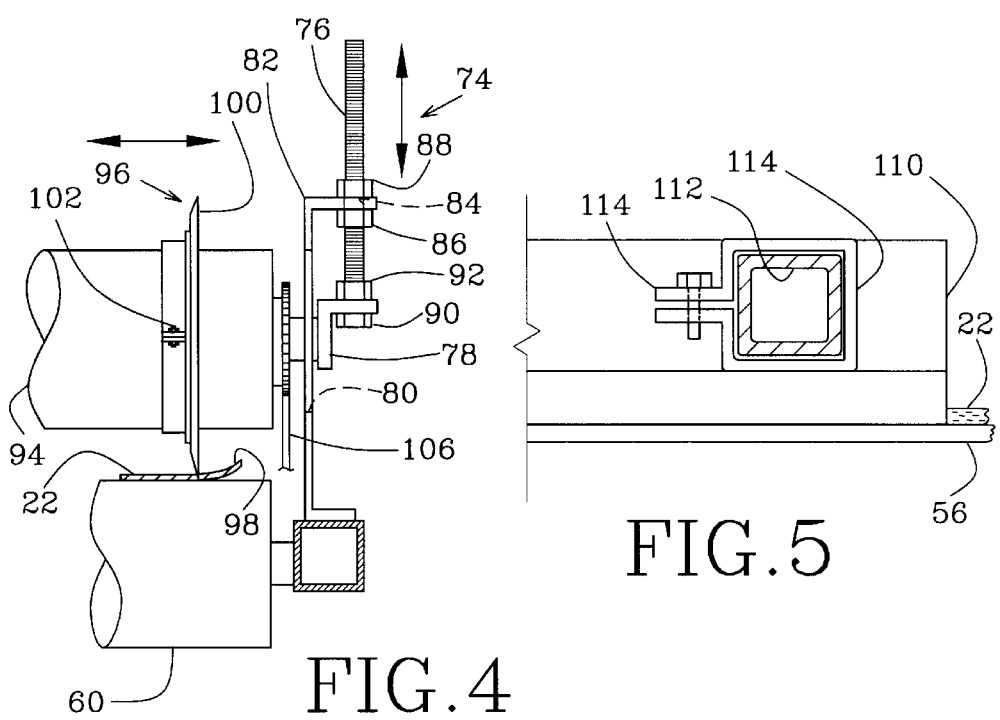
FIG. 4
FIG. 5

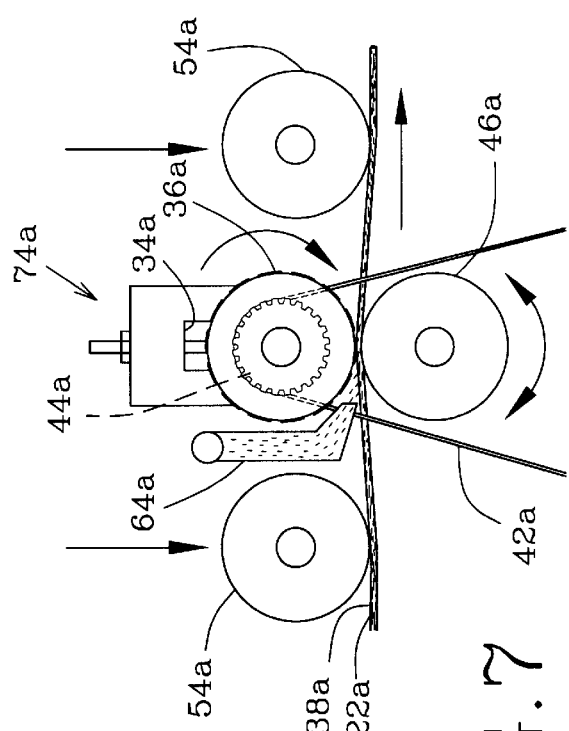
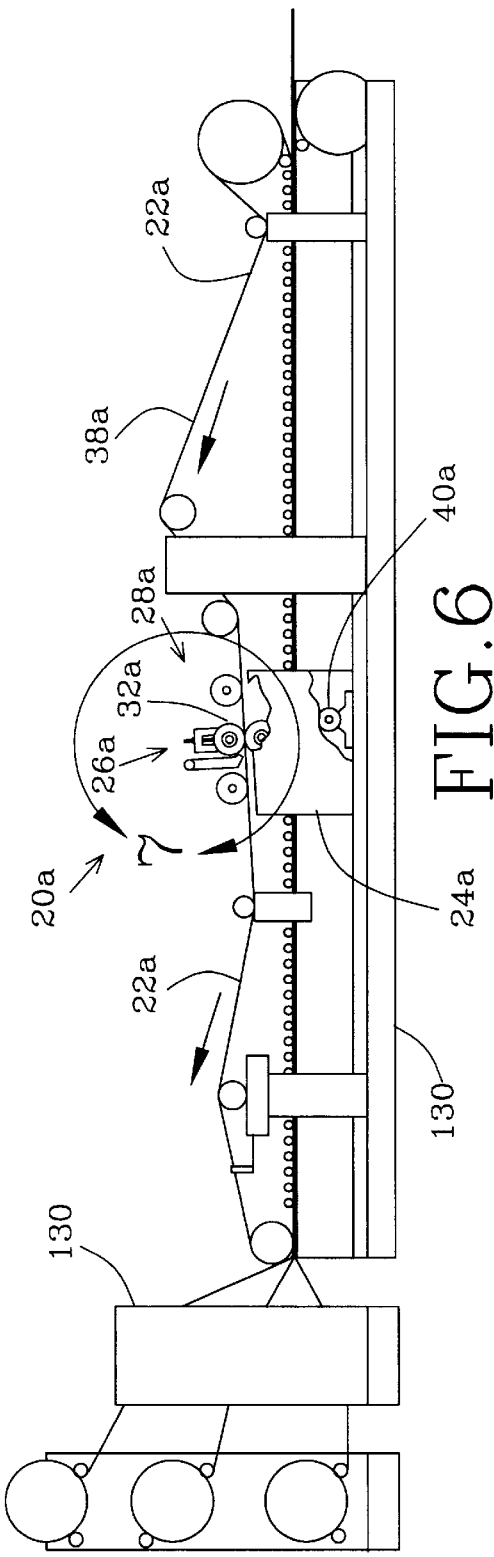

METHOD AND APPARATUS FOR RECYCLING BELTS

FIELD OF THE INVENTION

The present invention relates to an apparatus for refurbishing belts, more specifically to an apparatus for refurbishing belts having a degraded surface and made out of any material such as a woven or needled fabric with multiple fibers or the like, and to the method for refurbishing the same, the apparatus may be installed as a kit on existing corrugator belt machines or the like.

BACKGROUND OF THE INVENTION

Corrugator belts are commonly used in corrugated cardboard or papermaker manufacturing machines. They are mainly used as a conveying tool that ensures a uniform pressure on the external sheets of cardboard that are glued or bonded to a central corrugated core to properly and uniformly pull them without relative sliding movement. During this bonding process, relatively high temperatures are encountered and the humidity contained therein needs to escape through the whole surface being bonded and through the belt itself. Such a machine needs to process relatively wide sheets of cardboard to be efficient, as wide as 300 centimeters (118 inches). To that effect, the corrugator belt has to be so manufactured that it would allow humidity to go through over its entire surface. These types of expensive belts are typically made out of a flat-woven or needled multilayer structure fabric embedding a multitude of fibers. After many weeks and months of continuous use, the surface of the belt in contact with the cardboard starts getting dirty and lose efficiency. Also, when smaller width cardboard is processed as opposed to the one covering the full width, the unused edges of the belt are more affected by the overflow of glue or the like that causes non-uniform tearing of the unused surfaces.

This non-uniform tearing of the belt at the edges drastically prevent any further use of that belt with the manufacturing of wider cardboard since the uniform pressure required over the whole surface could not be provided anymore due to edge locally degraded belt surface, without high risks of having to scrap the entire batch of cardboard that would be manufactured in these conditions.

When such a belt becomes so damaged, the cardboard manufacturer needs to discard the used belt and replace it by an expensive new one. To date, nobody has ever come out with a process or an apparatus that would enable a refurbishment or recycling of these discarded used belts by resurfacing the damaged surface so as to provide them with a pristine-like nice and flat surface proper for re-use.

U.S. Pat. Nos. 5,626,447 and 5,882,157 granted to Buysman et al. on May 6, 1997 and Mar. 16, 1999 respectively disclose a belt refurbishing apparatus particularly suited for modular belting formed from universally shaped injection-molded plastic modules, essentially rigid materials, which have generally smooth and impervious surfaces generally used in conveyor systems used for transporting products, especially food products. In such applications of belts, there is no concern about the general flatness of the "working" surface of the belt as opposed for the belts generally used in paper industry. Also, any cutting device used by Buysman et al. would not be suitable to prevent any fiber tear off damage of the belt during refurbishing of the latter. Also, Buysman et al. do not disclose any means that ensures a proper holding of the belt against the cutting device as required for a non-rigid material belt as well as a push down action of the latter around the cutting device and away from the same. Finally, Buysman et al. do not need to refurbish relatively wide belting since his wide belts typically are formed by modules mounted adjacent to each other, and dismounted whenever required such as for refurbishing, thereby not requiring an accurate uniform thickness removal over the entire belt surface.

OBJECTS OF THE INVENTION

It is therefore a general object of the present invention to provide an apparatus for refurbishing belts of the character described which obviates the above noted disadvantages.

An advantage of the present invention is that the apparatus for refurbishing belts is especially suitable for relatively long and wide belts, such as commonly known corrugator belts, that are generally expensive to discard and replace.

A further advantage of the present invention is that the apparatus for refurbishing belts can be assembled as a kit onto an existing belt conveying machine such that the belt can be regularly recycled on-site without removal for optimum overall cost and performance of the machine.

Another advantage of the present invention is that the apparatus for refurbishing belts can remove a determined amount of a degraded surface of the belt independently of the direction of displacement of the latter relative to the grinding member.

A further advantage of the present invention is that the apparatus for refurbishing belts has a grinding member that defines a helical grinding region and a complementary helical nongrinding region thereof to smooth off the grinding operation.

Another object of the present invention is to provide a method for refurbishing belts having a degraded surface that corresponds to the steps performed by the above described apparatus.

SUMMARY OF THE INVENTION

According to one aspect of the present invention, there is provided an apparatus for refurbishing a fabric belt, the fabric belt defining a belt width and a generally perpendicular belt length, the fabric belt having a degraded surface, the apparatus comprises:

a frame for partially supporting the fabric belt thereon;

a grinding member including a grinding roller for selectively and uniformly removing a determined amount of the degraded surface along the belt width, the grinding roller defining a generally cylindrical surface and a grinding roller axis substantially parallel to the belt width, the grinding roller rotatably mounting on the frame about the grinding roller axis, the cylindrical surface carrying a grinding device secured thereto, the grinding device defining a generally helical grinding region of the cylindrical surface and a substantially complementary helical non-grinding region thereof;

a driving member secured to the frame for displacing the fabric belt relative to the grinding member along the belt length; and a positioning member mounted on the fame adjacent the grinding member for positioning the fabric belt adjacent the grinding member during removal of the determined amount of the degraded surface of the fabric belt, the positioning member including:

a belt abutment member spacedly posItioned relative to the grinding member for abuttingly retaining the fabric belt against the grinding member; and a belt tensioning member for longitudinally tensioning the fabric belt adjacent the grinding roller in the direction of the belt length.

Preferably, the apparatus comprises an adjusting member adjusting the position of the grinding member relative to the belt perpendicularly relative to the belt displacement direction, thereby enabling selection of the determined amount of the degraded surface being removed by the grinding member.

Preferably, the apparatus includes a vacuum cleaning device mounted on the frame adjacent the grinding member and the belt to vacuum particles of the degraded surface removed by the grinding member away therefrom.

Preferably, the apparatus includes a trimming device mounted on the frame for selectively cutting away damaged lateral edges of the belt along the belt length during displacement of the belt relative to the trimming device by the driving member.

Preferably, the trimming device includes:
a trimming lower roller and a generally spacedly opposed trimming upper roller for receiving the belt therebetween, each of the lower and upper rollers defining a corresponding lower and upper roller axis, the lower and upper rollers rotatably mounting on the frame about the respective lower and upper roller axis, the lower and upper roller axes being substantially parallel to the belt width;
an annular-shaped cutter axially slidably mounted on a respective end of one of the lower and upper rollers, the annular-shaped cutters abuttingly contacting the other of the lower and upper rollers so as for trimming the damaged lateral edges of the belt; and
a trimming roller motor selectively actuating rotation of the one of the lower and upper rollers supporting the annular-shaped cutters.

Preferably, the grinding member includes a grinding roller motor selectively actuating rotation of the grinding roller, the grinding roller having a length at least equal to the belt width.

Preferably, the abutment member includes an abutment roller defining an abutment roller axis and a longitudinal apex for abuttingly supporting the fabric belt thereon and having a length at least equal to the belt width, the abutment roller rollably mounting on the frame about the abutment roller axis, the abutment roller being spacedly positioned relative to the grinding roller with the abutment roller axis substantially parallel to the grinding roller axis so as for abuttingly receiving the fabric belt therebetween;
the belt tensioning member includes a tensioning roller positioned on either side of the grinding roller in the direction of the belt length and adjacent thereto, each of the tensioning rollers defining a tensioning roller axis and being rotatably mounted on the frame about the tensioning roller axis, the tensioning roller axes being substantially parallel to the grinding roller axis, each of the tensioning rollers being slidably mounted on the frame and deflecting the fabric belt in a direction generally perpendicular to the degraded surface away from the grinding roller and towards the abutment roller so as to ensure tension within the fabric belt along the belt length adjacent the grinding roller, whereby the fabric belt being in abutment contact with the longitudinal apex of the abutment roller so as to allow the grinding roller to come in contact with the degraded surface of the fabric belt adjacent the longitudinal apex of the abutment roller and grind away the determined amount of the degraded surface therefrom during displacement of the fabric belt relative to the grinding roller.

Preferably, the driving member includes an abutment roller motor selectively actuating rotation of the abutment roller.

Preferably, the positioning member further includes:
a plurality of driving rollers spaced apart from each other along the belt length in the belt displacement direction on either side of the grinding roller, each driving roller defining a respective driving roller axis and rotatably mounting on the frame about the respective driving roller axis, the driving roller axes being substantially parallel to the grinding roller axis, the abutment roller motor selectively actuating rotation of the driving rollers, each of the driving rollers defining a longitudinal apex for abuttingly supporting the belt thereon;
a belt bed mounted on the frame for slidably supporting the belt inbetween respective longitudinal apex of two adjacent of the abutment and driving rollers.

Preferably, the apparatus includes lateral guide members slidably mounted on the belt bed in the direction of the belt width for guiding lateral edges of the belt during its relative displacement thereto.

Preferably, the grinding device is sand paper helically bonded onto the cylindrical surface of the grinding roller.

According to a second aspect of the present invention, there is provided a kit for refurbishing a fabric belt, the fabric belt defining a belt width and a generally perpendicular belt length, the fabric belt having a degraded surface, the fabric belt being installed onto a belt conveyor machine, the kit comprises:
a frame secured to the belt conveyor machine;
a grinding member including a grinding roller for selectively and uniformly removing a determined amount of the degraded surface along the belt width, the grinding roller defining a generally cylindrical surface and a grinding roller axis substantially parallel to the belt width, the grinding roller rotatably mounting on the frame about the grinding roller axis, the cylindrical surface carrying a grinding device secured thereto, the grinding device defining a generally helical grinding region of the cylindrical surface and a substantially complementary helical nongrinding region thereof; and
a positioning member mounted on the frame adjacent the grinding member for positioning the fabric belt adjacent the grinding member during removal of the determined amount of the degraded surface of the fabric belt, the positioning member including:
a belt abutment member spacedly positioned relative to the grinding member for abuttingly retaining the fabric belt against the grinding member, and
a belt tensioning member for longitudinally tensioning the fabric belt adjacent the grinding roller in the direction of the belt length, the belt conveyor machine displacing the fabric belt relative to the grinding member along the belt length.

According to a third aspect of the present invention, there is provided a method for refurbishing a fabric belt, the fabric belt defining a belt width and a generally perpendicular belt length, the fabric belt having a degraded surface, the method comprises the following steps of:
providing a frame for partially supporting the fabric belt thereon;
providing a grinding member, the grinding member including a grinding roller for selectively and uniformly removing a determined amount of the degraded surface along the belt width, the grinding roller defining a generally cylindrical surface and a grinding roller axis substantially parallel to the belt width, the grinding roller rotatably mounting on the frame about the grinding roller axis, the cylindrical surface carrying a grinding device secured thereto, the grinding device defining a generally helical grinding region of the cylindrical surface and a substantially complementary helical non-grinding region thereof;

providing a driving member secured to the frame for displacing the fabric belt relative to the grinding member along the belt length; and providing a positioning member mounted on the frame adjacent the grinding member for positioning the fabric belt adjacent the grinding member during removal of the determined amount of the degraded surface of the fabric belt, the positioning member including;
a belt abutment member spacedly positioned relative to the grinding member for abuttingly retaining the fabric belt against the grinding member; and
a belt tensioning member for longitudinally tensioning the fabric belt adjacent the grinding roller in the direction of the belt length.

BRIEF DESCRIPTION OF THE DRAWINGS

In the annexed drawings, like reference characters indicate like elements throughout.

FIG. 3 is an enlarged partially broken elevation view taken along line 3 of FIG. 2 showing the arrangement of the different drums around the grinding member to ensure tension in the belt and its deflected path shape;

FIG. 4 is an enlarged section view taken along line 4—4 of FIG. 1;

FIG. 5 is an enlarged section view taken along line 5 of FIG. 3;

FIG. 6 is an elevation view of another embodiment of the present invention installed as a kit onto an existing belt conveyor machine; and FIG. 7 is an enlarged section view taken along line 7 of FIG. 6.

DETAILED DESCRIPTION OF THE PREFERRED EMBODIMENT

Figure 1:
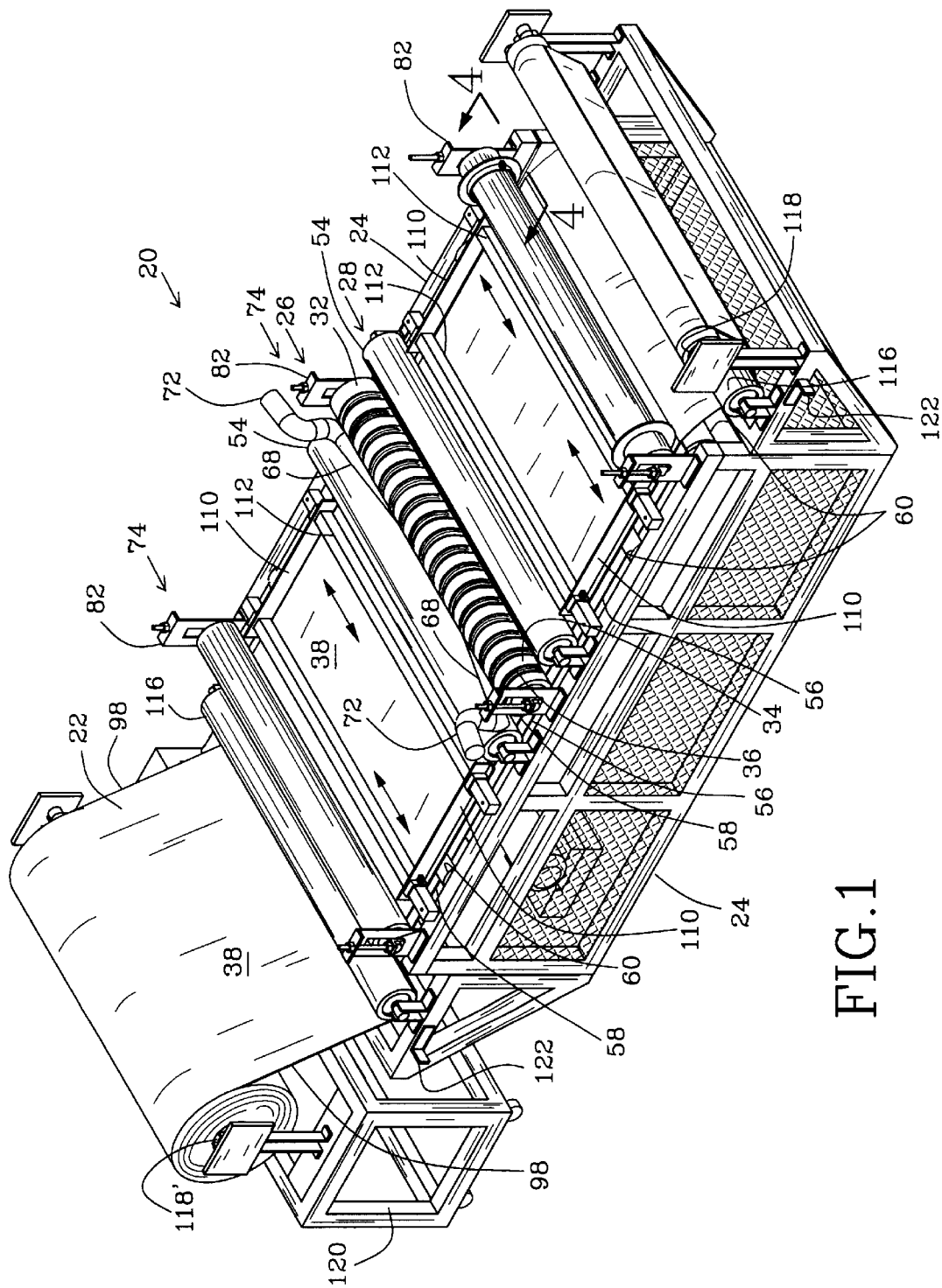
FIG. 1 is a front perspective view of an embodiment according to an apparatus for refurbishing belts of the present invention.
Figure 2:
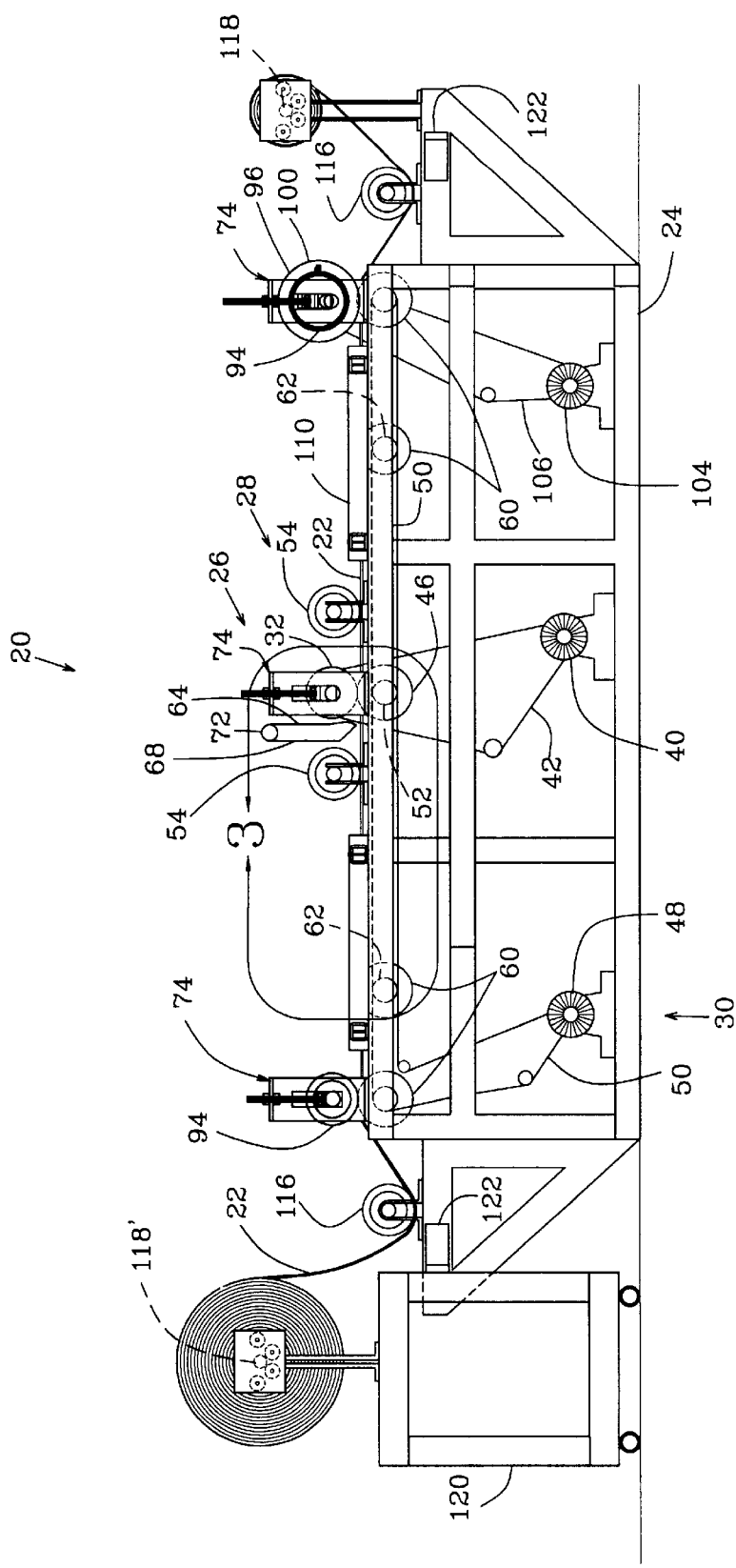
FIG. 2 is an elevation view of the embodiment of FIG. 1.

Referring to FIGS. 1 and 2, there is shown an embodiment 20 of an apparatus for refurbishing belts 22 in accordance to the present invention. The apparatus 20 mainly includes a frame 24 supporting a grinding member 26, a positioning member 28 and a driving member 30. Preferably, the belt 22 to be refurbished is a belt 22 made out of a flat-woven or needled multilayer structure fabric embedding a multitude of transverse fibers used as a conveying tool of the cardboard sheets for the manufacturing of corrugated cardboard in corrugator machines in the paper industry. Any other types of belting of different sizes could also be similarly refurbished by the apparatus 20 of the present invention.

The grinding member 26, preferably a main roller 32, or grinding roller, having a generally cylindrical surface 34 carrying a grinding device, preferably a sand paper 36, is used to selectively removing or grinding off a determined amount of a degraded surface 38 of the belt 22. The sand paper 36 is preferably helically bonded onto the cylindrical surface 34 in order to have a plurality of alternate non-grinding and grinding areas to ensure a smooth progressive grinding operation, the non-grinding areas forming a helical non-grinding area substantially complementary to the helical grinding area as illustrated in FIG. 1. The. roller 32 is rotatably mounted on its shaft about its axis that substantially lies in the direction of the width of the belt 22 and, is of a length at least equal to or longer than the width of the belt 22. The main roller 32 is preferably substantially heavy and includes an internal anti-vibration system in order to remain straight during the removal operation. The removal of the determined amount of the degraded surface 38 is simultaneously and uniformly performed along the width and the length of the belt 22. The rotation of the main roller 32 is induced by a first motor 40, or grinding roller motor, preferably electrical with variable speed, via a chain 42 and a sprocket gear 44 coaxially mounted on the main roller 32.

In order to ensure that the belt 22 is firmly held during the removal of the determined amount of the degraded surface 38, the positioning member 28 includes a belt abutment member, preferably a lower central roller 46, or abutment roller, of a length substantially equal to the length of the main roller 32, being oriented with its axis parallel to and just underneath the main roller 32 to hold the belt 22 tight against the main roller 32. The belt 22 is displaced relative to the main roller 32 in the direction of its length by the driving member 30, preferably a second motor 48, or abutment roller motor, actuating a second chain 50 mounted onto a second sprocket gear 52 coaxially secured to the central roller 46. The second motor 48 is preferably a reversible electrical motor with variable speed. To ensure a proper displacement of the belt 22 as well as to provide a substantial tension into the belt 22 in either side of the main roller 32 in the direction of its length, the positioning member 28 further includes a belt tensioning member, preferably two upper rollers 54, or tensioning rollers, closely adjacent to on either side of the main roller 32. The two upper rollers 64 are freely rotatably mounted onto their respective shaft about their axis transversely vertically slidably mounted onto the frame 24. Under their respective weight, the upper rollers 54 substantially push the belt 22 down against the tower central roller 46 and a belt bed 56 onto which the belt 22 slides, and away from the main roller 32. The belt bed 56, preferably made-out of UHM (Ultra-High Modulus) thermoplastic plates 58, or any other easy gliding material having substantially high resistance to abrasion, is substantially horizontal and vertically positioned slightly lower than the upper longitudinal apex region of the lower roller 46 in order to force the belt 22 of being displaced from underneath one of the upper rollers 54 up to the upper longitudinal apex region of the lower roller 46 and back down underneath the second upper roller 54, in a deflected path shape relative to the belt displacement direction as shown in FIG. 3. For proper removal of a determined amount of material of the degraded surface 38 of the belt 22, the tangential speed of the grinding device 36 relative to the displacement of the belt 22 is preferably at least an order of magnitude (10×) higher.

In order to better drive the belt 22, the positioning member 28 preferably further includes a plurality of driving rollers 60, with their respective coaxially mounted sprocket gear 62, driven by the second motor 48 and the second chain 50. These driving rollers 60 are parallel to each other and spaced apart on either side, upstream and downstream in the direction of the belt displacement, of the upper rollers 54 to define a plane substantially parallel to the belt 22 being linearly displaced over its substantially flat bed 56 formed by the plates 58 located between adjacent lower and driving rollers 46, 60. Only the top longitudinal apex region of all driving rollers 60 are slightly protruding above the bed 56. Preferably, the lower central roller 46 and the driving rollers 60 have their respective cylindrical surface made out of a rubber-type material for a sufficient friction to avoid sliding of the belt 22 being displaced and tracked thereby.

Additionally, the apparatus 20 may include a vacuum cleaning device 64 properly located along and close to the belt 22 and the grinding area of the main roller 32 to collect all particles and chips 66 being removed from the degraded surface 38 of the belt 22 by the grinding device 36, to leave the grinding area clean. Due to the typical large width of the belt 22 that may be as wide as 300 cm (118 inches), the vacuum device 64 is preferably divided into two sections 68 along the main roller 32 and preferably removably supported by the frame 24. Each section 68 has an inlet opening 70 the particles are sucked into and an outlet opening 72 through which they are collected and discarded preferably via a standard commercial vacuum system (not shown).

As shown in FIG. 4, the apparatus 20 preferably includes art adjusting member 74 to vertically adjust the position of the main roller 32, or some other side rollers 94 as specifically depicted on FIG. 4, relative to the lower central roller 46 to accurately selectively determine the amount of material of the degraded surface 38 of the belt 22 to be removed. Referring to FIG. 4 more specifically, the vertical adjustment is preferably similarly performed at each end of the roller 94 via a vertical screw 76 axially secured to a bracket 78 itself secured to the end of the shaft of the roller 94 and slidably moving along a vertical slot opening guide 80 of a roller shaft support 82, and screwably engaging a threaded hole 84 into that support 82. Once the adjustment is completed, the screw 76 is locked in place by the two lower and upper nuts 86, 88 respectively, and the shaft of the main roller 32 is locked by the screw head 90 underneath the bracket 78 and a nut 92 above the same. When associated with the grinding member 26, this adjusting member 74 allows to successively accurately remove different amounts of material of a same degraded surface 38 when the overall amount to be removed is too large for a single pass without possibly damaging the belt 22. Obviously, the adjusting member 74 could also include hydraulic actuators, or the like mechanism, simultaneously operating at both longitudinal ends of the roller 32 or 94.

In order to avoid the belt 22 from flapping over the outermost driving roller 60 and improve the belt driving, respective additional upper side rollers 94 rotatably mounted on their shaft about their axis, preferably with a respective adjusting member 74, are located and aligned just above their respective outermost driving roller 60.

As shown in FIG. 1 and more specifically in FIG. 4, one of these upper side rollers 94, or trimming upper rollers, may include a trimming device 96 for selectively trimming away damaged edges 98 of the belt 22 along is length during relative displacement of the latter to the trimming device 96. Preferably, the trimming device 96 includes one annular-shape cutter 100 slidably mounted on each end of the upper side roller 94. Each annular-shape cutter 100 is partially released from the upper side roller 94 by loosening screw 102, properly axially positioned and secured in place by tightening back the screw 102. Finally the upper side roller 94 is vertically adjusted via its adjusting member 74 to have the outer perimeter of the cutter 100 touching its respective lower driving roller 60, or trimming lower roller. Preferably, the trimming device 96 also includes a third motor, or trimming roller motor, preferably a variable electrical motor 104, actuating a third chain 106 and a sprocket gear 108 axially mounted to the upper side roller 94.

As shown in FIGS. 1, 3 and 5, the apparatus 20 preferably includes a guiding member, preferably slidably adjustable lateral guides 110 to properly guide the edges 98 of the belt 22 during its displacement relative to its bed 56. These lateral guides 110 substantially laying over the bed 56 and touching the same are slidably mounted on rods 112 supported by the frame 24 transverse to the belt 22, and are secured to the rods 112 using clamps 114 when adjusted in place properly abutting the respective edge 98 of the belt 22.

The apparatus 20 also preferably includes one tensioning side roller 116 rotatably mounted on its axis and located at each extremity, upstream and downstream, of its respective outermost driving roller 60 and vertically lower relative to the latter. The belt 22 passes underneath both of these tensioning side rollers 116 to ensure proper tension of the belt 22 being tracked by the outermost driving rollers 60. The frame 24 of the apparatus 20 is also adapted, on one side at least, to releasably receive a shaft 118 supporting a belt 22 rolled therearound that needs to be refurbished or recycled. At the other side of the apparatus 20, a shaft 118' adapted to be rolled by the belt 22 could be mounted on a different small and preferably wheeled frame 120, or winding trolley, to be positioned next to its respective tensioning side roller 116 by abutting against abutment plates 122 located of the frame 24. Optionally, when the wheeled frame 120 is receiving the belt 22 instead of feeding the same, the shaft 118' of the latter is preferably driven by a variable speed motor (not shown) that would be mounted on the same. The speed of the variable motor being preferably manually adjusted from time to time to adapt the tangential speed of the belt 22 being rolled therearound to essentially the same of its displacement speed on the frame 24.

Since the second motor 48 is preferably reversible, the belt 22 may be independently displaced in both directions relative to the entire apparatus 20 and its main roller 32, without affecting the grinding operation due to the relatively high speed of the grinding device 36 relative to the displaced belt 22.

As shown in FIGS. 6 and 7, a second embodiment 20a of the apparatus for refurbishing belts 22a can alternatively be a kit 20a directly installed on an existing paper conveying machine 130 onto which the degraded surface 38a of the belt 22a could be refurbished from time to time without having to dismantle it from the machine 130. The kit 20a would at least include a small frame 24a supporting a grinding member 26a with its main roller 32a, or grinding roller, a grinding device 36a on its surface 34a and its grinding roller motor 40a, chain 42a and sprocket gear 44a, a positioning member 28a with its belt abutment member, the lower roller 46a, or abutment roller. Preferably, the kit 20a would also include and adjusting member 74a for the main roller 32a and a vacuum cleaning device 64a. Optionally, if required depending of the tension of the belt 22a in either side of the main roller 32a and the direction of the belt 22a upstream and downstream of the main roller 32a, one or two upper rollers 54a, or tensioning rollers, of the belt tensioning member of the positioning member 28a may be required close to the main roller 32a, as shown in FIGS. 6 and 7. No driving member would be required since the belt 22a is directly driven and tensioned by the conveying machine 130.

As it would be obvious to a person skilled in the art, all rollers have their axis substantially perpendicular to a same plane and any of them could be made out of a plurality of coaxially spaced apart small cylinders as a possible alternate option. Also, other grinding devices 36 could be used as long as they do not further damage the degraded surface 38 during its removal.

The method described here above to recycle belts with degraded surface using the apparatus 20, 20*a* or the like is also an integral part of the present invention.

Although an embodiment has been described herein with some particularity and details, many modifications and variations of the preferred embodiment are possible without deviating from the scope of the present invention.

I claim:

1. An apparatus for refurbishing a fabric belt, said fabric belt defining a belt width and a generally perpendicular belt length, said fabric belt having a degraded surface, said apparatus comprising:

a frame for partially supporting said fabric belt thereon;

a grinding member including a grinding roller for selectively and uniformly removing a determined amount of the degraded surface along the belt width, said grinding roller defining a generally cylindrical surface and a grinding roller axis substantially parallel to the belt width, said grinding roller rotatable mounting on said frame about said grinding roller axis, said cylindrical surface carrying a grinding device secured thereto, said grinding device defining a generally helical grinding region of said cylindrical surface and a substantially complementary helical non-grinding region thereof;

a driving member secured to the frame for displacing the fabric belt relative to the grinding member along the belt length; and a positioning member mounted on the frame adjacent said grinding member for positioning the fabric belt adjacent said grinding member during removal of the determined amount of the degraded surface of the fabric belt, said positioning member including:

a belt abutment member spacedly positioned relative to said grinding member for abuttingly retaining the fabric belt against said grinding member; and a belt tensioning member for longitudinally tensioning the fabric belt adjacent the grinding roller in the direction of the belt length.

2. An apparatus as defined in claim 1, comprising an adjusting member adjusting the position of the grinding member relative to the belt perpendicularly relative to the belt displacement direction, thereby enabling selection of the determined amount of the degraded surface being removed by the grinding member.

3. An apparatus as defined in claim 1, including a vacuum cleaning device mounted on the frame adjacent the grinding member and the belt to vacuum particles of the degraded surface removed by the grinding member away therefrom.

4. An apparatus as defined in claim 1, including a trimming device mounted on said frame for selectively cutting away damaged lateral edges of the belt along the belt length during displacement of the belt relative to the trimming device by the driving member.

5. An apparatus as defined in claim 4, wherein said trimming device includes:

a trimming lower roller and a generally spacedly opposed trimming upper roller for receiving said belt therebetween, each of said lower and upper rollers defining a corresponding lower and upper roller axis, said lower and upper rollers rotatably mounting on the frame about said respective lower and upper roller axis, said lower and upper roller axes being substantially parallel to the belt width;

an annular-shaped cutter axially slidably mounted on a respective end of one of said lower and upper rollers, said annular-shaped cutters abuttingly contacting the other of said lower and upper rollers so as for trimming said damaged lateral edges of said belt; and a trimming roller motor selectively actuating rotation of the one of said lower and upper rollers supporting said annular-shaped cutters.

6. An apparatus as defined in claim 1, wherein the grinding member includes a grinding roller motor selectively actuating rotation of the grinding roller, said grinding roller having a length at least equal to the belt width.

7. An apparatus as defined in claim 6, wherein the abutment member includes an abutment roller defining an abutment roller axis and a longitudinal apex for abuttingly supporting said fabric belt thereon and having a length at least equal to the belt width, said abutment roller rollably mounting on said frame about said abutment roller axis, said abutment roller being spacedly positioned relative to said grinding roller with said abutment roller axis substantially parallel to said grinding roller axis so as for abuttingly receiving said fabric belt therebetween;

said belt tensioning member includes a tensioning roller positioned on either side of said grinding roller in the direction of the belt length and adjacent thereto, each of said tensioning rollers defining a tensioning roller axis and being rotatably mounted on said frame about said tensioning roller axis, said tensioning roller axes being substantially parallel to said grinding roller axis, each of said tensioning rollers being slidably mounted on said frame and deflecting said fabric belt in a direction generally perpendicular to said degraded surface away from said grinding roller and towards said abutment roller so as to ensure tension within said fabric belt along said belt length adjacent said grinding roller, whereby the fabric belt being in abutment contact with said longitudinal apex of said abutment roller so as to allow the grinding roller to come in contact with said degraded surface of said fabric belt adjacent said longitudinal apex of said abutment roller and grind away said determined amount of the degraded surface therefrom during displacement of said fabric belt relative to said grinding roller.

8. An apparatus as defined in claim 7, wherein said driving member includes an abutment roller motor selectively actuating rotation of the abutment roller.

9. An apparatus as defined in claim 8, wherein said positioning member further includes:

a plurality of driving rollers spaced apart from each other along said belt length in the belt displacement direction on either side of said grinding roller, each driving roller defining a respective driving roller axis and rotatably mounting on said frame about said respective driving roller axis, said driving roller axes being substantially parallel to the grinding roller axis, said abutment roller motor selectively actuating rotation of said driving rollers, each of said driving rollers defining a longitudinal apex for abuttingly supporting said belt thereon;

a belt bed mounted on said frame for slidably supporting said belt inbetween respective longitudinal apex of two adjacent of said abutment and driving rollers.

10. An apparatus as defined in claim 9, including lateral guide members slidably mounted on said belt bed in the direction of the belt width for guiding lateral edges of said belt during its relative displacement thereto.

11. An apparatus as defined in claim 6, wherein said grinding device is sand paper helically bonded onto the cylindrical surface of the grinding roller.

12. A kit for refurbishing a fabric belt, said fabric belt defining a belt width and a generally perpendicular belt length, said fabric belt having a degraded surface, said fabric belt being installed onto a belt conveyor machine, said kit comprising:

a frame secured to said belt conveyor machine;

a grinding member including a grinding roller for selectively and uniformly removing a determined amount of the degraded surface along the belt width, said grinding roller defining a generally cylindrical surface and a grinding roller axis substantially parallel to the belt width, said grinding roller rotatably mounting on said frame about said grinding roller axis, said cylindrical surface carrying a grinding device secured thereto, said grinding device defining a generally helical grinding region of said cylindrical surface and a substantially complementary helical non-grinding region thereof; and a positioning member mounted on the frame adjacent said grinding member for positioning the fabric belt adjacent said grinding member during removal of the determined amount of the degraded surface of the fabric belt, said positioning member including:

a belt abutment member spacedly positioned relative to said grinding member for abuttingly retaining the fabric belt against said grinding member; and a belt tensioning member for longitudinally tensioning the fabric belt adjacent the grinding roller in the direction of the belt length, said belt conveyor machine displacing the fabric belt relative to the grinding member along the belt length.

13. A kit as defined in claim 12, comprising an adjusting member adjusting the position of the grinding member relative to the belt perpendicularly relative to the belt displacement direction, thereby enabling selection of the determined amount of the degraded surface being removed by the grinding member.

14. A kit as defined in claim 12, including a vacuum cleaning device mounted on the frame adjacent the grinding member and the belt to vacuum particles of the degraded surface removed by the grinding member away therefrom.

15. A kit as defined in claim 12, wherein the grinding member includes a grinding roller motor selectively actuating rotation of the grinding roller, said grinding roller having a length at least equal to the belt width.

16. A kit as defined in claim 15, wherein the abutment member includes an abutment roller defining an abutment roller axis and a longitudinal apex for abuttingly supporting said fabric belt thereon and having a length at least equal to the belt width, said abutment roller rollably mounting on said frame about said abutment roller axis, said abutment roller being spacedly positioned relative to said grinding roller with said abutment roller axis substantially parallel to said grinding roller axis so as for abuttingly receiving said fabric belt therebetween;

said belt tensioning member includes a tensioning roller positioned on either side of said grinding roller in the direction of the belt length and adjacent thereto, each of said tensioning rollers defining a tensioning roller axis and being rotatably mounted on said frame about said tensioning roller axis, said tensioning roller axes being substantially parallel to said grinding roller axis, each of said tensioning rollers being slidably mounted on said frame and deflecting said fabric belt in a direction generally perpendicular to said degraded surface away from said grinding roller and towards said abutment roller so as to ensure tension within said fabric belt along said belt length adjacent said grinding roller, whereby the fabric belt being in abutment contact with said longitudinal apex of said abutment roller so as to allow the grinding roller to come in contact with said degraded surface of said fabric belt adjacent said longitudinal apex of said abutment roller and grind away said determined amount of the degraded surface therefrom during displacement of said fabric belt relative to said grinding roller.

17. A kit as defined in claim 15, wherein said grinding device is sand paper helically bonded onto the cylindrical surface of the grinding roller.

18. A method for refurbishing a fabric belt, said fabric belt defining a belt width and a generally perpendicular belt length, said fabric belt having a degraded surface, said method comprising the following steps of:

providing a frame for partially supporting said fabric belt thereon;

providing a grinding member, said grinding member including a grinding roller for selectively and uniformly removing a determined amount of the degraded surface along the belt width, said grinding roller defining a generally cylindrical surface and a grinding roller axis substantially parallel to the belt width, said grinding roller rotatably mounting on said frame about said grinding roller axis, said cylindrical surface carrying a grinding device secured thereto, said grinding device defining a generally helical grinding region of said cylindrical surface and a substantially complementary helical non-grinding region thereof;

providing a driving member secured to the frame for displacing the fabric belt relative to the grinding member along the belt length; and providing a positioning member mounted on the frame adjacent said grinding member for positioning the fabric belt adjacent said grinding member during removal of the determined amount of the degraded surface of the fabric belt, said positioning member including:

a belt abutment member spacedly positioned relative to said grinding member for abuttingly retaining the fabric belt against said grinding member; and a belt tensioning member for longitudinally tensioning the fabric belt adjacent the grinding roller in the direction of the belt length.

19. A method as defined in claim 18, further comprising the following steps of:

providing an adjusting member to adjust the position of the grinding member relative to the belt perpendicularly relative to the belt displacement direction, thereby enabling selection of the determined amount of the degraded surface being removed by the grinding member; and providing a vacuum cleaning device mounted on the frame adjacent the grinding member and the belt to vacuum particles of the degraded surface removed by the grinding member away therefrom.

20. A method as defined in claim 18, wherein the grinding member includes a grinding roller motor selectively actuating rotation of the grinding roller, said grinding roller having a length at least equal to the belt width;

the abutment member includes an abutment roller defining an abutment roller axis and a longitudinal apex for abuttingly supporting said fabric belt thereon and having a length at least equal to the belt width, said abutment roller rollably mounting on said frame about said abutment roller axis, said abutment roller being spacedly positioned relative to said grinding roller with said abutment roller axis substantially parallel to said grinding roller axis so as for abuttingly receiving said fabric belt therebetween;

said belt tensioning member includes a tensioning roller positioned on either side of said grinding roller in the direction of the belt length and adjacent thereto, each of said tensioning rollers defining a tensioning roller axis and being rotatably mounted on said frame about said tensioning roller axis, said tensioning roller axes being substantially parallel to said grinding roller axis, each of said tensioning rollers being slidably mounted on said frame and deflecting said fabric belt in a direction generally perpendicular to said degraded surface away from said grinding roller and towards said abutment roller so as to ensure tension within said fabric belt along said belt length adjacent said grinding roller, whereby the fabric belt being in abutment contact with said longitudinal apex of said abutment roller so as to allow the grinding roller to come in contact with said degraded surface of said fabric belt adjacent said longitudinal apex of said abutment roller and grind away said determined amount of the degraded surface therefrom during displacement of said fabric belt relative to said grinding roller.

\* \* \* \* \*